3,136,695
ANHYDROUS THIXOTROPIC GEL SUSTAINED
RELEASE THERAPEUTIC COMPOSITIONS
AND METHOD OF PREPARATION
Robert Paul Tansey, Hudson, Ohio, assignor to Strong
  Cobb Arner Inc., Cleveland, Ohio, a corporation of
  New York
No Drawing. Filed Mar. 10, 1961, Ser. No. 94,696
12 Claims. (Cl. 167—82)

This invention relates to novel compositions of matter which are initially formed within a liquid phase and subsequently transformed into a dry, solid phase and more particularly with the incorporation of one or more therapeutically active substances into a homogeneous system which is specially devised to meet predetermined specifications relating to the stability and release of these agents from a prepared matrix. The system can be applied to the preparation of stabilized forms of pharmaceutical products or to the fabrication of sustained release medication. With minor adjustments and modifications, the release of one or more active ingredients from the matrix can be regulated to occur within short or extended periods of time in either acid or alkaline media.

Chemical substances characterized as being water-soluble or water-insoluble can be integrated into the proposed system and subsequently processed, using standard procedures into a variety of pharmaceutical forms. Certain liquid materials which are water-soluble, water-miscible or water-immiscible can also be made into solid, dry compositions of matter.

It is an object of this invention to produce stable forms of therapeutic agents which can be designed to possess definite time release characteristics. A further object is to provide practical, workable and feasible compositions of matter that can be readily prepared by and adapted to standard pharmaceutical processing techniques in which reproducible results can be consistently obtained.

In accordance with the invention it has been found that medicinally active substances which are integrated into the new system possess enhanced physical and chemical stability. Also, it was found that the treated material becomes more flowable, more compressible and more easily fabricated into desired pharmaceutical products than when the usual standard procedures are used, which are familiar to those in the art of compounding.

With the advent of more complicated medicinal products, with particular reference to time release drugs, a number of systems have been recommended to meet the requirements of this form of medication. Some of these systems make use of aqueous menstruums or slugging procedures to obtain uniform powder or granule forms that can be further processed into pharmaceutical products. Others cite physical mixtures of therapeutic agents in wax-like materials whereby the base substance is first melted at elevated temperatures in order to incorporate the active agents by a physical mixing procedure. Other methods describe the use of special coating procedures using hydrophilic materials. In all of these methods there is a possibility of non-uniformity in the final product and the possibility of chemical degradation at elevated heat and exposure to moisture. While the present day standard processing techniques may be acceptable for many products, a number of instances occur in which it is necessary to resort to complicated methods and precautions to formulate a product. Accordingly, there is need at present for a more universal and less critical means of processing and preparing pharmaceutical forms.

This invention comprises a novel method of integrating one or more therapeutic agents in a matrix using anhydrous media to produce a stable, intact and unified product. The main ingredient of the invention is a specially modified hydroxy glyceryl ester of a monobasic acid consisting of 18 carbon atoms and the ester having an acid value of 2 and known commercially as "Thixcin R" (Baker Castor Co.). This ester, which can be characterized as being a hydrophobic sol, and which is a modified 1-hydroxy stearin and a glycerol partial ester of stearic acid, has the facility of converting an organic system into a semi-rigid mass. It acts as a sol in the solvent phase and is formed into thread-like aggregates which interlock and disperse throughout the liquid. These highly porous semisolid aggregates are capable of adsorbing other substances and a uniform gel like mass can be formed with suitable stirring. Since the glyceryl ester forms a colloidal dispersion in organic solvents at room temperature, it has been found best to operate under these conditions. Higher levels of heat dissolve the sol and upon cooling agglomerates of the ester are formed, which are difficult to disperse. Because of the capability of the glyceryl ester to create a reversible isothermal sol-gel formation with selected anhydrous solvents, this invention affords a unique means of producing uniform and reproducible pharmaceutical products. More commonly expressed, the liquid phase containing the hydrophobic sol and other additives is thixotropic, and the gelled mass becomes free-flowing during agitation, but sets up to a gel again when it remains undisturbed. The application of this phenomenon to powder granulation procedures is unique and once a uniform distribution of ingredients is accomplished within the gel formation, the mass can remain homogeneous under the subsequent drying and screening treatments.

The organic solvents used to produce the compositions of matter relevant to this invention are selected from solvents of varying polarities in which the active therapeutic agent may or may not be soluble. Suitable gels were formed independent of this factor. Such solvents as low molecular weight alcohols, e.g., lower alkyl alcohols such as methyl alcohol, ethyl alcohol and isopropyl alcohol, as well as chloroform, acetone, trichloroethylene, methylene chloride and petroleum ether can be used, and mixtures thereof.

Also, it can be shown that with the judicious selection of certain additives, which can be readily incorporated in the system, much greater flexibility can be imparted to the matrix in terms of controlled drug release and physical and chemical properties of this novel composition of matter. The release of a therapeutic substance from the prepared matrix is effected through processes of erosion and leaching in aqueous media (i.e., body fluids).

The type of additive to be used can be chosen from several classifications of chemical compounds and is dependent solely upon what is desired in the final formulation. Examples of some of the additives which proved to be effective are certain water-soluble or water insoluble cellulose gums (i.e., carboxy methyl cellulose, methyl cellulose, ethyl cellulose, and hydroxy ethyl cellulose). Some polyvinyl compounds prove advantageous, such as polyvinyl-pyrrolidone, and certain polyvinyl alcohols and acetates. The inclusion of phthalates such as cellulose acetate phthalate or starch acetate phthlate imparts unique properties. Liquid non-ionic surfactants (i.e., polyoxyethylene sorbitan esters, sorbitan fatty acid esters and alkyl aryl polyether alcohols) were found to be suitable in some cases. Solid non-ionic surface active agents which can be used are polyethylene glycol esters of stearic acid, sorbitan fatty acid esters, polyoxypropylene compounds and polyethylene glycols. Mixtures thereof can also be used to advantage, depending on the particular product being produced and the properties desired therein thus providing unusual versatility.

This invention also embraces the use of agents which are added specifically to maintain the stability of the one or more therapeutically active agents present in a particular matrix. Substances classified as stabilizers, preservatives, chelating agents and buffering compounds can be used. More specifically, antioxidants (i.e., butylated hydroxy anisole, butylated hydroxy toluene, nordihydroguaiaretic acid, ascorbyl palmitate, mixed tocopherols and ethyl hydrocaffeate) proved to be effective in stabilizing certain vitamins. The addition of chelating substances (i.e., calcium chelate of disodium ethylenediaminetetraacetic acid and citric acid) proved to be satisfactory.

Pharmaceutical forms made in accordance with this invention and methods for preparation of these forms (i.e., powders, capsules and tablets) are illustrated in the following examples.

Example I

Samples of acetylsalicylic acid were prepared using different amounts of the modified hydroxy glyceryl ester, respectively, and tablets were made.

In one sample 300 grams of acetylsalicylic acid are mixed with 35 grams of lactose and 15 grams of the hydrophobic sol until a uniform blend is produced. In the second sample is a similar blend is made, but only 5 grams of the hydrophobic sol is used.

Both samples are separately granulated with a solvent phase composed of methylene chloride and methyl alcohol. Soft, solvent-wet masses are formed which solidify as the solvent evaporates. The respective gel masses can be screened to the proper granule size either before or subsequent to the drying cycle. Drying is done using sufficient heat to cause evaporation. If time is not a factor drying can be done under ordinary room temperature conditions.

After the granulations are dry, 20 grams of dried starch are incorporated in each sample and lastly are added as lubricants 2.5 grams of talcum and 2.5 grams of Sterotex. Samples were made to contain 300 mg. of acetylsalicylic acid per tablet.

The release data obtained on the acetylsalicylic acid using artificial gastric and intestinal fluids on Sample 1 and Sample 2 are as follows:

| | Cumulative release, percent | |
|---|---|---|
| | #1 | #2 |
| After 1 hour gastric fluid | 15 | 25 |
| After 2 hours intestinal fluid | 40 | 46 |
| After 4 hours intestinal fluid | 50 | 58 |
| After 6 hours intestinal fluid | 61 | 71 |
| After 8 hours intestinal fluid | 82 | 89 |

The U.S.P. method for determining tablet disintegration was used to get these values. The tablets in both formulations eroded evenly during the testing period.

Although Example I specifically refers to acetylsalicylic acid, it should be understood that other medicinally active compounds can also be incorporated in the system to form products having specified release patterns either for short or prolonged periods of time. Thus, drugs generally classified as analgesics, antihistamines, antispasmodics, tranquilizers, appetite depressants, antibiotics, stimulants, sedatives and others can be used either alone or in combinations as components of the described system to produce time release products. Also, vitamins can be treated to produce sustained release and/or more stable forms.

Additional examples are given to illustrate further applications of the new matrix system.

Example II

A two-layer tablet containing 12 mg. of chlorprophenpyridamine maleate was made in which 4 mg. was put in one layer and 8 mg. in the other. Layer #1 was processed to contain 4 grams of the chlorprophenpyridamine maleate and 15 grams of the above hydroxy glyceryl ester dispersed in lactose. Layer #2 was made up to contain an 8 to 40 ratio of the active agent to the hydrophobic sol in lactose. The separate granulations were made using a mixture of trichloroethylene and ethyl alcohol. The gel mass in each case was screened and dried similarly to that described in Example I. After lubricants (i.e., talcum, magnesium stearate) are blended in the respective granulations, tablets are compressed on a two-layer tablet press.

In order to establish the specific release patterns in each layer additional tablets were made as simple compressed tablets using a portion of each layer granulation.

Release data of the chlorprophenpyridamine maleate on the respective layer tablets and on the two-layer tablet are as follows:

| | Cumulative release, percent | | |
|---|---|---|---|
| | Layer 1 | Layer 2 | Two-layer tab. |
| Gastric fluid after 1 hour | 52 | 35 | 40 |
| Intestinal fluid after 2 hours | 76 | 49 | 61 |
| Intestinal fluid after 4 hours | 93 | 60 | 81 |
| Intestinal fluid after 6 hours | 96 | 72 | 89 |
| Includes residue assayed after 6 hrs | 100 | 96 | 97 |

Layer 1 (tablet)—4 mg. of active agent.
Layer 2 (tablet)—8 mg. of active agent.
Two-layer tablet—12 mg. of active agent.

Example III

Two separate tablet samples containing phenobarbital were made using the same ratios of phenobarbital to the modified hydroxy glyceryl ester, except that in one of the samples a hydrophilic cellulose gum was added to modify the release pattern.

The ingredients and their amounts are as follows:

| | M/g. tablet | |
|---|---|---|
| | Tablet #1 | Tablet #2 |
| Phenobarbital | 60 | 60 |
| Modified hydroxy glyceryl ester | 15 | 15 |
| Methyl cellulose | | 10 |
| Lactose | 130 | 130 |
| Magnesium stearate | 5 | 5 |

The methyl cellulose in Tablet #2 is integrated in the matrix along with the phenobarbital, hydroxy glyceryl ester, and lactose. Each granulation is made similarly to that described in the previous examples.

The release data obtained on phenobarbital using simulated body fluids in the U.S.P. tablet disintegration apparatus is as follows:

| | Cumulative release, percent | |
|---|---|---|
| | Tablet #1 | Tablet #2 |
| After 1 hour gastric fluid | 21 | 36 |
| After 2 hours intestinal fluid | 34 | 53 |
| After 4 hours intestinal fluid | 46 | 71 |
| After 6 hours intestinal fluid | 58 | 88 |
| Includes residue after 6 hour period | 101 | 102 |

This example shows the effect obtained by integrating a water-soluble cellulose gum in the matrix. Other samples which were made using carboxy methyl cellulose or hydroxyethyl cellulose in place of the methyl cellulose demonstrated a similar faster release rate as found in comparing the above data.

Other samples were prepared in which the water-soluble cellulose gum is added subsequent to the granulation step by blending in the cellulose gum with the dried granules. This method also effects a faster release pattern.

*Example IV*

A stabilized dry form of vitamin A was prepared in accordance with the following formulation to contain 500,000 units of vitamin A per gram.

Ingredients: Per 100 grams
Vitamin A acetate _____ 18
Hydroxy glyceryl ester _____ 20
Methyl cellulose _____ 25
Mannitol—a sufficient quantity.[1]
Antioxidants [2] _____ (0.05%)

[1] Amount depends on the potency of the vitamine A source.
[2] Equal amounts of butylated hydroxy toluene and butylated hydroxy anisole were added to total 0.05%.

The vitamin A acetate is dissolved in a solvent solution composed of methylene chloride and methyl alcohol containing the antioxidants. This solvent mixture is dispersed on a uniform mixture containing the hydroxy glyceryl ester, cellulose gum, and mannitol. The resulting gel mass is dried in vacuo at 35° C. The dried material is then reduced to a powder.

Storage samples show the following data:

| Time: | Vitamin A Content, units per gram |
|---|---|
| Initial | 523,000 |
| Eight months at room temperature | 491,000 |

*Example V*

A sample of vitamin $B_{12}$ containing 1% of $B_{12}$ activity was made in a matrix composed of 20 parts of hydroxyglyceryl ester and 79 parts of mannitol.

An additional sample similar to the above, but also containing 10 parts of cellulose acetate phthalate and 10 parts of polyvinylpyrrolidine in place of part of the mannitol was prepared.

In preparing these samples crystalline vitamin $B_{12}$ was dissolved in an organic solvent system composed of methylene chloride and methyl alcohol. The glyceryl ester and mannitol are blended uniformly. In the sample containing polyvinylpyrrolidone, this compound is also mixed with the mannitol mixture. The cellulose acetate phthalate was dissolved in the same solvent system referred to above and the vitamin $B_{12}$ incorporated therein.

In each case the solvent phase was dispersed evenly onto the powder mixture and the resulting gel mass was dried in vacuo at 35° C. and subsequently screened into a powder.

Samples stored for six months at room temperature showed no loss in potency in either formulation.

The sample containing the cellulose acetate phthalate, when exposed to an artificial gastric fluid for one hour showed only an 8% release of vitamin $B_{12}$, whereas the bulk of the vitamin is released in artificial intestinal fluid within three hours.

In the other sample containing no cellulose acetate phthalate, a gradual release was effected in which 22% was available in acid media after one hour and a gradual release was noted over a 4 hour period in alkaline media.

*Example VI*

A powder sample of ascorbic acid was prepared to contain 3% of hydroxy glyceryl ester and 1% of glucono delta lactone, using a procedure similar to those described in other examples.

Samples stored for six months at room temperature and 40° C. showed no darkening or loss of potency.

*Example VII*

A stable sample of folic acid was prepared containing the hydroxy glyceryl ester, methyl cellulose, mannitol and an antioxidant (butylated hydroxy anisole). The folic acid was converted to its sodium form by dissolving a stoichiometric amount of sodium hydroxide in the alcohol portion of the organic system used to prepare the sample.

The antioxidant was dissolved in the organic phase along with the folic acid. This solution is then dispersed on a uniform blend of the other remaining ingredients. The mass is dried in vacuo at 35° C.

Stability samples show no loss in potency after six months at room temperature.

It should be understood that various changes may be made in the process as herein described without adversely affecting the results attained. Various changes in additives differing from those given in the embodiments of this invention may be made without departing from the spirit and scope thereof. Instead of using a glycerol partial ester of stearic acid, there may be used a glycerol partial ester of palmitic acid, or combinations or mixtures thereof.

What is claimed is:

1. An anhydrous sustained release composition of matter comprising a thixotropic gel containing a hydroxy glycerol ester of a monobasic fatty acid of 16 to 18 carbon atoms and having an acid value of 2, and a therapeutic agent dispersed through said gel and releasable therefrom according to a desired pattern.

2. A composition of matter according to claim 1 in which is incorporated an additive selected from the group consisting of carboxy methyl cellulose, methyl cellulose, ethyl cellulose, hydroxy ethyl cellulose, polyvinylpyrrolidone, polyvinyl alcohol, polyvinyl acetate, cellulose acetate phthalate, and mixtures thereof.

3. A composition of matter according to claim 1 in which is incorporated a stabilizer for the therapeutic agent.

4. A composition of matter according to claim 1 in which is incorporated a surfactant.

5. A composition of matter according to claim 1 in which the gel constitutes a matrix in which the therapeutic agent is integrated and by which its physical and chemical stability is increased.

6. A composition of matter according to claim 1 in which the thixotropic gel has been made with at least one anhydrous organic solvent of preselected polarity.

7. A composition of matter according to claim 6 in which the organic solvent is selected from the group consisting of lower alkyl alcohols, trichloroethylene, methylene chloride, acetone, chloroform, petroleum ether and mixtures thereof.

8. A composition of matter comprising a thixotropic gel containing a hydroxy glyceryl ester of stearic acid, an anhydrous organic solvent, and a therapeutic agent dispersed through said gel and releasable therefrom by erosion in the presence of body fluids.

9. A therapeutic composition of matter comprising a thixotropic gel containing a hydroxy glyceryl ester of stearic acid, a volatile anhydrous organic solvent and a therapeutic agent dispersed through said gel and releasable therefrom according to a desired pattern by erosion in the presence of body fluids, said composition being stable and homogeneous and, when dried and screened, formed into dosage units.

10. A therapeutic composition of matter comprising a thixotropic gel containing a hydroxy glyceryl ester of stearic acid, a volatile anhydrous organic solvent and a therapeutic agent admixed with a stabilizing agent therefor dispersed through said gel and releasable therefrom according to a desired pattern by erosion in the presence of body fluids, said composition being stable and homogeneous and, when dried and screened, formed into dosage units.

11. A process that comprises uniformly integrating at least one therapeutically active agent into the hydroxy glyceryl ester of a monobasic fatty acid of 16 to 18 carbon atoms in an anhydrous system to form a thexotropic gel in which the therapeutic agent is stabilized.

12. A process for preparing a prolonged release therapeutic composition which comprises forming a blend of a therapeutic agent, a thixotropic gel and a filler, granulating the blend with a solvent mixture of methylene chloride and methyl alcohol, solidifying the resulting gel mass by solvent removal, screening to form granules and tableting with excipients.

References Cited in the file of this patent

UNITED STATES PATENTS

| | | |
|---|---|---|
| 2,218,591 | Taylor | Oct. 22, 1940 |
| 2,529,461 | Schneiderwirth | Nov. 7, 1950 |
| 2,895,879 | Browkaw et al. | July 21, 1959 |
| 2,921,883 | Reese et al. | Jan. 19, 1960 |
| 2,951,792 | Swintosky | Sept. 6, 1960 |
| 2,987,445 | Levesque | June 6, 1961 |
| 2,991,226 | Millar | June 4, 1961 |